June 1, 1971     E. S. ZEMEL     3,582,490
METHOD OF MAKING AND USING PROTEIN QUANTITATION
PLATE FOR ELECTROPHORETIC APPARATUS
Original Filed Jan. 11, 1968

INVENTOR.
EDWARD S. ZEMEL

United States Patent Office 3,582,490
Patented June 1, 1971

3,582,490
METHOD OF MAKING AND USING PROTEIN QUANTITATION PLATE FOR ELECTROPHORETIC APPARATUS
Edward S. Zemel, 708 W. 192nd St., Apt. 1A, New York, N.Y. 10040
Original application Jan. 11, 1968, Ser. No. 697,098. Divided and this application Feb. 9, 1970, Ser. No. 9,599
Int. Cl. B01k 5/00
U.S. Cl. 204—180     7 Claims

ABSTRACT OF THE DISCLOSURE

A quantitation plate is made by coating a strip of, for example, polyester with an agar-antiserum mixture. Wells are formed in the coating and standard concentrations and a specimen of a protein to be measured are placed in the wells. The proteins are caused to migrate electrophoretically and the magnitude of migration is charted to quantitate the specimen.

OTHER APPLICATIONS

This is a divisional application based on application Ser. No. 697,098, filed on Jan. 11, 1968.

DRAWING

DETAILED DESCRIPTION

This invention relates to protein quantitation plates for electrophoretic apparatus and to methods of making and using the same.

An object of the invention is to provide an improved and extremely sensitive method of measuring large or small amounts of protein in body fluids, inclusive of but not limited to dilute body fluids.

To achieve the above object, the principles of zone electrophoresis and the precipitin reaction of a specific antigen-antibody combination are combined and used with a plate or strip having a special coating as will be shown. The zone electrophoresis is used to move the protein through a supporting matrix constituted in the coating and immersed in a buffer under the influence of an electrical field.

The precipitin reaction is utilized to provide a visible result which is readily inspected. The distance that a particular protein moves through a matrix depends on its own electrical charge at a specific pH, the strength of the electrical field applied, the endosmotic effect of the buffer, and the matrix. This is used in techniques of the invention to quantitate the protein and to provide a standard against which the measurement of the protein can be compared.

The special coating used in my novel method is made, as noted above, with an antiserum. This antiserum is specific to the protein which is to be measured. Proteins, due to their particular molecular arrangements, produce such specific immunoglobulins or antibodies, when injected into host animals. Generally, this involves injecting a protein from a human into a rabbit, goat, sheep or horse, and obtaining an immunoglobulin or antiserum which reacts specifically with the human protein. It has been found that rabbit antiserum specific for human proteins generally gives the best results in preparing coatings in accordance with the invention.

The formation of precipitin lines in the matrix constituted in a coating prepared in accordance with the invention at the optimal ratio of antigen to antibody (commonly known as the "equivalence zone") is used to identify and, with proper manipulation of dilutions, to quantitate either the antigen if the concentration of antibody is known, or the antibody if the concentration of antigen is known. Measurements of the precipitin lines are charted, as will be shown, to determine concentrations.

Figure 1:
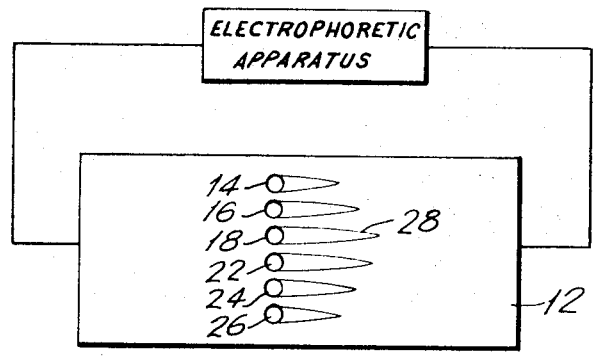
FIG. 1 is a top plan view of a plate prepared in accordance with the invention with an electrophoretic cell diagrammatically illustrated.
Figure 2:
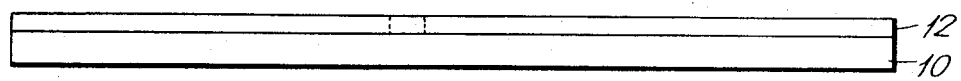
FIG. 2 is a side view of the plate of FIG. 1.

To facilitate comprehension of the invention, a strip or plate is illustrated in FIGS. 1 and 2 of the drawing. Said strip includes a supporting base 10 having a coating 12 thereon. Holes or wells 14, 16, 18, 20, 22 and 24 are formed in the coating 12 to accommodate standards and specimens as will be explained. The coating 12 is the special coating referred to above. The details of its preparation will be given below.

The invention utilizes the following materials and apparatus:

(1) An electrophoresis kit and regulated power supply in which strips or plates of the invention are used. The specific type of kit is not critical to the invention, and any commercially available type can be used. Excellent results are obtained with the Spinco electrophoresis cell, Model R, with baffles, or with any of the Gelman electrophoresis cells.

(2) A supporting base (e.g., base 10 in FIG. 2) such as a rigid glass plate or a flexible plastic strip or microfilm. These may specifically be, for example, Du Pont Gronar polyester P 40–B leader, unperforated 35 mm. photographic film base, or Minnesota Mining and Manufacturing Co.'s 3M unperforated 35 mm. clear, look-in microfilm, or any commercially available and known material suitable for use as a supporting base for electrophoretic analysis.

(3) A buffer to fill the chambers of the electrophoretic cell and keep the pH of the entire system constant. The buffer is also mixed with agar such as ion agar, purified or pure agar, or agarose to form a gelled solution as noted hereinafter. The buffer which is used is generally slightly basic (ph 8.0–9.0), although acidic and more basic buffers can be used to measure certain proteins. The ionic strength of the buffer depends on the specific protein being examined. For example, a high ionic strength buffer would generally be used to measure weak proteins, whereas a low ionic strength buffer would be used to measure proteins present in large amounts.

(4) An electrophoretic medium or matrix (e.g., coating 12, FIG. 2) through which the standards and specimens being tested migrate. This medium includes agar, ion agar, purified agar, pure agar, or agarose, which is mixed with the above-noted buffer to form the gelled solution. Since each medium has a different ionic strength, the exact medium to be used depends on the protein being measured and the amount of protein present in the body fluid.

(5) An antiserum specific for the particular protein which is to be measured. This is generally commercially available, although it can be prepared in known manner for specific proteins or the like.

(6) Serum standards which contain known concentrations of the protein which is to be measured. These are also commercially available.

(7) A tool such as a thin rod or wire or any type of hole-punching device for making the aforenoted wells in the medium. These wells are, for example, approximately 2 mm. in diameter. These will serve to accommodate respectively the body fluid to be examined and the standard concentrations. The wells may be round holes or squares and can be larger or smaller than 2 mm. in diameter depending on the number of samples to be tested.

(8) Capillary tubes or a microsyringe capable of delivering exactly 2 $\mu$l. (.002 ml.) of a sample. This amount is ideal for wells with a diameter of 2 mm. and a depth of 1–2 mm. If the wells are larger or smaller, the amount of sample is correspondingly varied.

(9) Tannic acid solution to bring out the precipitin bands. A 1–2% solution is sufficient, although more may be used.

(10) Physiologically normal saline to wash out excess protein from the supporting base. Different concentrations of saline may be used with similar results, but best results are obtained with an .85% saline solution.

(11) Protein dye to stain the proteins to obtain a permanent record. Any of the protein dyes can be used, and excellent results have been obtained with Amido Black 10–B.

(12) Acetic acid rinse to wash out the excess dye from the supporting base. A 1–5% solution is sufficient, although a higher concentration of acetic acid can be used.

(13) A 50–50–10 solution to clear up the background of the plate or strip, thus allowing the precipitin band to stand out and be easily measured. The 50–50–10 solution is, for example, made of 50 ml. of distilled water, 50 ml. of methanol, and 10 ml. of glacial acetic acid, or any similar proportion.

The steps involved in an illustrative process of the invention are as follows:

(1) Strips of polyester leader, unperforated 35 mm. photographic film, unperforated 35 mm. clear, look-in microfilm, plastic strips, or glass plates are cut and placed on a level surface warm enough to prevent agar from solidifying immediately, but not so hot as to denature the protein. The temperature should be in the range of 50 or 60 degrees centigrade. The dimensions of a glass plate can be, for example, 3" x 2". These dimensions may be varied so that the strips or plates can be placed into an electrophoretic cell without difficulty. If glass is used, it is usually connected to the buffer by filter paper wicks which are immersed in the buffer and attached to the glass.

(2) A buffer in made to put into the electrophoretic cell and help make the gelled medium. For a buffer of pH 8.6 and an ionic strength of .075, a commercially available buffer (e.g., Spinco Buffer B–2) is dissolved in 2000 ml. of water. For a buffer of pH 8.6 and an ionic strength of .1, 41.2 grams of sodium 5,5-diethyl barbiturate and 7 grams of 5,5-diethyl barbituric acid are dissolved in 2000 ml. of water. 10 grams of merthiolate/100 ml. of solution or sodium azide (.01% total concentration) are added to the buffers and the agar solutions to inhibit bacterial growth. Buffers of different pH's and different ionic strengths may be used depending on the protein being examined.

(3) A 1–2% agar, ion agar, pure agar, purified agar, or agarose solution gel, prepared by taking 1–2 grams of one of these and dissolving it in a warm mixture of 50 ml. of buffer and 50 ml. of water and adding a few drops of merthiolate, is heated until all particles are dissolved and a clear solution is obtained. The warm solution is then mixed with a specific antiserum to form a 1–15% antiserum-agar mixture (.05–.50 ml. anti-serum in 3 ml. agar) depending on the protein being measured. A 3% antiserum-agar solution has yielded the best results. The concentration of the agar-buffer solution may vary. If the agar solution is allowed to cool, it turns into a white gel, and it must be heated into a liquid in order to be used again. Excessive heating should be avoided.

(4) The agar-antibody mixture is poured onto the strips or glass plates to form a 1–2 mm. thick layer. The mixture should be warm and not hot (in the range of 50 or 60 degrees centigrade). Very high temperatures denature proteins.

(5) The strips or plates are placed in a cool, moist place such as a standard refrigerator for 10 minutes or longer to allow the agar to harden sufficiently.

(6) Holes (e.g., holes 14, 16, 18, 20, 22 and 24) are formed in the agar by, for example, using a needle with its bevel removed, or little squares are cut in the agar using a sharp edge. Three holes are provided for the serum standards, and the remaining holes are provided for the samples to be tested. The strips or plates are then ready for use. They are used in the following way:

(7) The wells are filled completely, or are slightly underfilled, with the samples to be tested. The first three wells are filled with serum standards which contain known concentrations of protein. The remaining wells are filled with the samples to be tested. Generally, 2 $\mu$l. (.002 ml.) of sample is sufficient to fill the wells, however, more may be required, or less, if the wells are larger or smaller than 2 mm. in diameter and 1–2 mm. deep. Capillary tubes which deliver exactly 2$\mu$l. of sample can be used with the strips or glass plates. The wells should not be overfilled. Since, the invention provides a very sensitive, technique, overfilling will change the results.

(8) The strips or plates are electrophoresed transversely of the array of wells for 30–90 minutes depending on the protein being measured. Generally, 60 minutes is sufficient for good results. The voltage may be, for example, 50 volts and the amperage may be 5–11 milliamps per strip, although these numbers may vary without changing the results. From one to eight strips may be electrophoresed at one time.

(9) After electrophoresis, the strips or plates are placed in a 1–2% tannic acid solution. The concentration may be higher. The tannic acid will generally bring out the precipitin lines (e.g., lines 28, FIG. 1) clearly enough so that they can be photographed, in which case the strips or plates are placed in distilled water for a few minutes to wash out the extra tannic acid and then photographed. If the bands are not clear after tannic acid, as will be the case with dilute body fluid proteins, the next step must be followed.

(10) For permanent results after photography, or in the case where the precipitin bands are not clearly visible after tannic acid is applied, the strips or plates are placed in distilled water for thirty minutes or more to remove all excess tannic acid, in saline solution for 12–48 hours to remove all excess protein not being measured, in water for 1 hour to remove excess saline, and are then stained. Amido-Black 10–B, made by taking 10 grams of the dye and dissolving in 100 ml. of glacial acetic acid and diluting to 100 ml. with distilled water, gives excellent results, although any of the other protein dyes may be used.

(11) After staining, excess dye is removed with three consecutive rinses of 1–2% acetic acid. Higher concentrations may be used. For a perfectly clear background, strips or plates are placed in a 50–50–10 solution for 5 minutes or longer. The strips or plates are allowed to dry.

(12) The proteins are then ready to be measured. All proteins move toward the anode at a slightly basic pH, except the immunoglobulins which move toward the cathode. The distance that the protein has diffused through the medium, which is seen by a white precipitin band from the well heading toward the anode (or, in the case if immunoglobulins, toward the cathode), is measured. First, the three standards are measured, and their distances travelled are plotted on a graph against their protein concentrations. Then the distances of the protein samples are measured, and the distances are inserted in the graph to find individual protein concentrations of each sample. The distance is measured from the center of the well to the end of the band. The protein concentrations are then compared to normal protein levels to see if there is an increase or decrease in the protein level. Results are accurate and reproducible, even for very small concentrations of protein or very dilute body fluids.

Listed below are some of the specific types and amounts of materials which have been used to quantitate specific proteins. These types and amounts of material give the best results, although other types and amounts may be employed with good results.

| Protein | Buffer ionic strength | Agar type | Alternate buffer ionic strength | Alternate agar type |
|---|---|---|---|---|
| 1 ........ IGG | .075 | Ionagar | .1 | Agarose. |
| 2 ........ IGA | .1 | ...do | .075 | Do. |
| 3 ........ IGM | .075 | ...do | .1 | Ionagar. |
| 4 ........ Coeruloplasmin | .075 | Agarose | .1 | Agarose. |
| 5 ........ Haptoglobin | .075 | ...do | .1 | Do. |
| 6 ........ Transferrin | .075 | ...do | .1 | Do. |
| 7 ........ Immunoglobulins, IGG plus IGA plus IGM. | .1 | ...do | .075 | Do. |
| 8 ........ Spinal fluid proteins (IGG, IGA, IGM, CRP). | .1 | ...do | .1 | Ionagar. |

Other proteins, including the proteins in urine and tissue extracts, can be quantitated using the previously described method.

Figure 3:
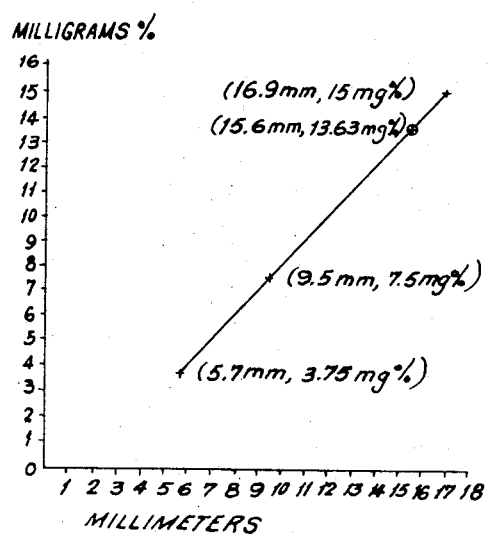
FIGS. 3 and 4 are respectively charts illustrating how quantitation is effected by the use of the plate of FIGS. 1 and 2.

The graph of FIG. 3 illustrates how the migration of three standards and a specimen can be charted. This graph shows a person with a normal amount of Coeruloplasmin in his blood. Three standard controls containing 15, 7.5 and 3.75 milligrams percent Coeruloplasmin were measured as to the distance that their precipitin bands had moved from the well in the center of the strip. The distances were found to be 16.9, 9.5, and 5.7 millimeters, respectively. Then the distance that the sample containing the unknown amount of Coeruloplasmin had moved from the center well was measured, and was found to be 15.6 millimeters. Inserting this value into the graph, the sample was found to contain 13.63 milligrams percent of Coeruloplasmin, which is in the normal range for that protein.

Figure 4:
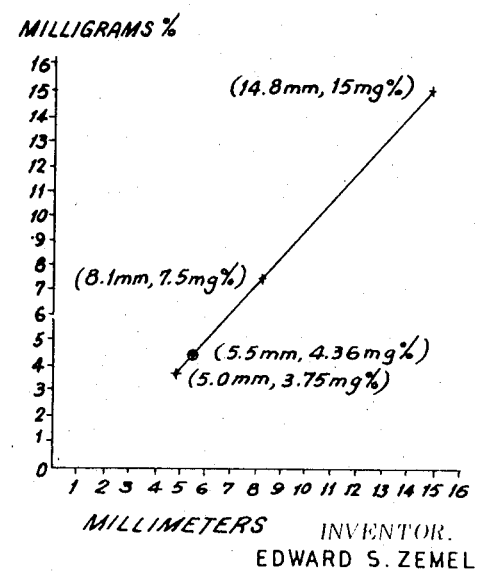

The graph of FIG. 4 illustrates a second example of a person with a low level of Coeruloplasmin in his blood. Three standard controls containing 15, 7.5, and 3.75 milligrams percent of Coeruloplasmin were measured as to the distance that the precipitin bands had moved from the well in the center of the strip. The distances were found to be 14.8, 8.1, and 5.0 millimeters, respectively. Then the distance that the sample containing the unknown amount of Coeruloplasmin had moved from the center well was measured, and was found to be 5.5 millimeters. Inserting this value into the graph, the sample was found to contain 4.36 milligrams percent of Coeruloplasmin, which is far below the normal range of that protein in the blood. This would probably indicate that the person has Wilson's Disease, a liver degenerative disease in which the Coeruloplasmin level in the blood is very low or absent.

The following table shows how additional proteins have been quantitated.

| Protein | Buffer ionic strength | Agar type | Amount of antiserum, ml./3 ml. agar |
|---|---|---|---|
| IGG | .075 | Agarose | .1 |
| IGG | .1 | ...do | .05 |
| IGG | .075 | Ionagar | .3 |
| IGG | .075 | Purified agar | .5 |
| IGG | .075 | Agarose | .3 |
| IGA | .1 | ...do | .5 |
| IGA | .075 | Ionagar | .05 |
| IGA | .1 | ...do | .1 |
| IGM | .075 | Agarose | .5 |
| IGM | .1 | ...do | .3 |
| IGM | .075 | Ionagar | .1 |
| IGM | .1 | ...do | .05 |
| Coeruloplasmin | .075 | Agarose | .05 |
| Do | .1 | ...do | .2 |
| Do | .075 | Ionagar | .1 |
| Haptoglobin | .075 | ...do | .3 |
| Do | .1 | ...do | .05 |
| Do | .075 | Ionagar | .5 |
| Do | .075 | Purified agar | .1 |
| Transferrin | .075 | Agarose | .3 |
| Do | .1 | ...do | .05 |
| Do | .075 | Ionagar | .5 |
| Do | .075 | Purified agar | .5 |

TABLE—Continued

| Protein | Buffer ionic strength | Agar type | Amount of antiserum, ml./3 ml. agar |
|---|---|---|---|
| Immunoglobulins (IGG plus IGA plus IGM). | .075 | Agarose | .05 |
| Do | .1 | ...do | .1 |
| Do | .075 | Ionagar | .3 |
| Do | .075 | Purified agar | .5 |
| Fibrinogen | .075 | Agarose | .1 |
| Do | .1 | ...do | .05 |
| Do | .075 | Ionagar | .3 |
| Do | .075 | Purified agar | .5 |
| $\beta_1 C/\beta_1 A$ | .075 | Agarose | .1 |
| $\beta_1 C/\beta_1 A$ | .1 | ...do | .3 |
| $\beta_1 C/\beta_1 A$ | .075 | Ionagar | .05 |
| $\beta_1 C/\beta_1 A$ | .075 | Purified agar | .5 |
| $\beta$-Lippoprotein | .075 | Agarose | .1 |
| Do | .1 | ...do | .3 |
| Do | .075 | Ionagar | .05 |
| Do | .075 | Purified agar | .5 |
| $\alpha_1$-Lippoprotein | .075 | Agarose | .1 |
| Do | .1 | ...do | .3 |
| Do | .075 | Purified agar | .5 |
| Do | .075 | Agarose | .1 |
| Do | .1 | ...do | .3 |
| Do | .075 | Ionagar | .04 |
| Do | .075 | Purified agar | .5 |

The immunoglobulin (IGG+IGA+IGM) antiserum forms 3 bands in the agar when electrophoresed with a serum sample, one corresponding to the IGG in the sample, one for the IGA, and one for the IGM in the sample.

There will now be obvious to those skilled in the art many modifications and variations of the procedures and plates or strips described above. These modifications and variations will not depart from the scope of the invention if defined by the following claims.

What is claimed is:

1. In a method of electrophoretic analysis the improvement comprising providing a support upon which is applied a coating of a substance which constitutes an electrophoretic matrix, said matrix having an antiserum mixed therein.

2. A method as claimed in claim 1, wherein said substance is an agar type substance and said antiserum is mixed with said substance in an amount of 1–15%.

3. A method as claimed in claim 2 comprising forming wells in said coating, loading some of the wells with standard concentrations of a protein and other of the wells with a protein containing sample, and applying an electrical potential along the coating to cause the proteins to migrate.

4. A method as claimed in claim 3 comprising applying to the coating a substance to render visible precipitin bands which result from the migrating proteins.

5. A method as claimed in claim 4 comprising mixing said substance with buffer and water and with said antiserum at a temperature less than that which will denature proteins but sufficiently warm as to maintain the mixture in fluid condition, pouring the fluid mixture onto said support, and cooling the mixture to harden the same.

6. A method as claimed in claim 5 comprising comparing the migration of the sample protein with that of the standard concentrations to quantitate the sample.

7. A method as claimed in claim 1 comprising arranging the wells in a linear array and applying the voltage transversely of said array.

References Cited

UNITED STATES PATENTS

| | | | |
|---|---|---|---|
| 3,428,547 | 2/1969 | Zec | 204—299 |
| 3,432,424 | 3/1969 | Zec | 204—299 |

JOHN H. MACK, Primary Examiner

A. C. PRESCOTT, Assistant Examiner

U.S. Cl. X.R.

204—299